(12) United States Patent
Xiao et al.

(10) Patent No.: US 9,092,454 B2
(45) Date of Patent: Jul. 28, 2015

(54) DISCOVERING CO-LOCATED QUERIES IN GEOGRAPHIC SEARCH LOGS

(75) Inventors: Xiangye Xiao, Beijing (CN); Longhao Wang, Beijing (CN); Xing Xie, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 377 days.

(21) Appl. No.: 12/147,868

(22) Filed: Jun. 27, 2008

(65) Prior Publication Data
US 2009/0265388 A1    Oct. 22, 2009

Related U.S. Application Data

(60) Provisional application No. 61/046,848, filed on Apr. 22, 2008.

(51) Int. Cl.
G06F 7/00 (2006.01)
G06F 17/30 (2006.01)

(52) U.S. Cl.
CPC .... G06F 17/30241 (2013.01); G06F 17/30041 (2013.01)

(58) Field of Classification Search
CPC ................................................ G06F 17/30041
USPC ......................................................... 707/763
See application file for complete search history.

(56) References Cited

U.S. PATENT DOCUMENTS

| | | | |
|---|---|---|---|
| 5,852,810 A | 12/1998 | Sotiroff et al. | |
| 5,930,474 A * | 7/1999 | Dunworth et al. | 709/217 |
| 7,007,228 B1 | 2/2006 | Carro | |
| 2004/0093325 A1 | 5/2004 | Banerjee et al. | |
| 2005/0065959 A1 | 3/2005 | Smith et al. | |
| 2005/0222989 A1 | 10/2005 | Haveliwala et al. | |
| 2006/0085392 A1 | 4/2006 | Wang et al. | |
| 2006/0106778 A1 | 5/2006 | Baldwin | |
| 2006/0149734 A1 | 7/2006 | Egnor et al. | |
| 2006/0218114 A1 | 9/2006 | Weare et al. | |

(Continued)

FOREIGN PATENT DOCUMENTS

WO    WO 2007087629 A1 *    8/2007

OTHER PUBLICATIONS

International Search Report and Written Opinion Received for PCT Application No. PCT/US2009/041471, mailed on Dec. 3, 2009, 10 pages.

(Continued)

*Primary Examiner* — Ajith Jacob
(74) *Attorney, Agent, or Firm* — Dan Choi; Judy Yee; Micky Minhas (57) ABSTRACT

Described is a technology by which co-located query patterns are mined from a data space such as a geographic search log. An overall data space (basic) approach and/or a lattice-based approach may be used when mining. The data space contains objects, each comprising associated type and location information. The location information is used to determine the distance between different two or more types of objects, e.g., pairs. The frequency of occurrence of those pairs within the data space determines whether that pairing of object types indicates a co-located pattern. Also described is partitioning the data space into regions, including for the purpose of categorizing a co-located pattern as a local pattern or a global pattern based on how that co-located pattern is distributed among the regions.

20 Claims, 5 Drawing Sheets

(56) References Cited

U.S. PATENT DOCUMENTS

2006/0271518 A1 11/2006 Wang et al.
2009/0049031 A1* 2/2009 Hepburn ............................ 707/5

OTHER PUBLICATIONS

Huang, et al., "Mining Co-Location Patterns with Rare Events from Spatial Data Sets", Geoinformatica, vol. 10, Issue 3, Sep. 2006, pp. 239-260.
Shekhar, et al., "Discovering Spatial Co-location Patterns: A Summary of Results", Lecture Notes in Computer Science, Advances in Spatial and Temporal Databases, vol. 2121, Jul. 2003, pp. 236-256.
Yoo, et al., "A Join-Less Approach for Co-Location Pattern Mining: A Summary of Results," ICDM, Fifth IEEE International Conference on Data Mining, 2005, pp. 813-816.
Chen, et al., "Efficient Query Processing in Geographic Web Search Engines", Proceedings of the 2006 ACM SIGMOD International Conference on Management of Data International Conference on Management of Data, ACM, 2006, pp. 12.
Gravano, et al., "Categorizing Web Queries According to Geographical Locality", Proceedings of the Twelfth International Conference on Information and Knowledge Management, 2003, ACM, pp. 9.
Sanderson, et al., "Analyzing Geographic Queries", 2004, pp. 3.
Agrawal, et al., "Mining Association Rules Between Sets of Items in Large Databases", Proceedings of the 1993 ACM SIGMOD International Conference on Management of Data, 1993, pp. 10.
Agrawal, et al., "Fast Algorithms for Mining Association Rules", in Proceedings of the 20th International Conference on Very Large Databases, Sep. 1994, pp. 1-32.
Beeferman, et al., "Agglomerative Clustering of a Search Engine Query Log", In Proceedings of the Sixth ACM SIGKDD International Conference on Knowledge Discovery and Data Mining, 2000, pp. 10.
Cucerzanm, et al., "Query Suggestion Based on User Landing Pages", Proceedings of the 30th Annual International ACM SIGIR Conference on Research and Development in Information Retrieval, 2007, ACM, pp. 2.
Davison, et al., "Finding Relevant Website Queries", Presented at the Twelfth International World Wide Web Conference, May 2003, pp. 3.
Facca, et al., "Mining Interesting Knowledge from Weblogs: a Survey", 2004, Elsevier B.V., pp. 1-18.
Fonseca, et al., "Discovering Search Engine Related Queries Using Association Rules", Journal of Web Engineering, Rinton Press, 2003, pp. 1-13.
Han, et al., "Geominer: a System Prototype for Spatial Data Mining", In Proceedings of the ACM SIGMOD International Conference on Management of Data, 1993, pp. 4.
Huang, et al., "Discovering Colocation Patterns from Spatial Data Sets: A General Approach", IEEE Transactions on Knowledge and Data Engineering, vol. 16, No. 12, Dec. 2004, IEEE Computer Society, IEEE, pp. 1472-1485.
Morimoto, "Mining Frequent Neighboring Class Sets in Spatial Databases", Proceedings of the Seventh ACM SIGKDD International Conference on Knowledge Discovery and Data Mining, 2001, ACM, pp. 353-358.
Ntoulas, et al., "What's New on the Web?: the Evolution of the Web from a Search Engine Perspective", 2004, ACM, pp. 12.
Shen, et al., "Building Bridges for Web Query Classification", Proceedings of the 29th Annual International ACM SIGIR Conference on Research and Development in Information Retrieval, ACM, 2006, pp. 131-138.
Srivastava, et al., "Web Usage Mining: Discovery and Applications of Usage Patterns from Web Data", vol. 1, No. 2, ACM SIGKDD, 2000, pp. 12-23.
Wang, et al., "Learn from Web Search Logs to Organize Search Results", Proceedings of the 30th Annual International ACM SIGIR Conference on Research and Development in Information Retrieval, ACM, 2007, pp. 8.
Wen, et al., "Query Clustering Using User Logs", ACM Transactions on Information Systems, vol. 20, No. 1, Jan. 2002, ACM, 2002, pp. 59-81.
Zhang, et al., "Fast Mining of Spatial Collocations", Proceedings of the Tenth ACM SIGKDD International Conference on Knowledge Discovery and Data Mining, ACM, 2004, pp. 384-393.

* cited by examiner

DISCOVERING CO-LOCATED QUERIES IN GEOGRAPHIC SEARCH LOGS

CROSS-REFERENCE TO RELATED APPLICATION

The present application claims priority to U.S. provisional patent application Ser. No. 61/046,848, filed Apr. 22, 2008 and hereby incorporated by reference.

BACKGROUND

Certain web search engines such as Live Local Search (local.live.com) are geographic in nature, and attract significant amounts of web traffic. For example, computer users frequently use such geographic search engines to view maps, decide driving directions, find places to dine, make travel plans, and so forth. This results in large amounts of data that may be saved in search engine logs.

Although general query log mining has been performed to extract information from traditional search logs, little use has been made of the geographic information that is available in geographic search engine logs. Such information may be highly relevant and valuable, such as for use in improving the quality of subsequent search results.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a data space such as a geographic search log is processed to discover co-located query patterns. An overall space (basic) approach and/or a lattice-based approach may be used when mining.

A data space of objects, each object having associated type and location information, is processed into co-located patterns, by determining geographic distances between different types of objects to find closely located object sets (e.g., pairs), and determining how often sets of closely-located objects appear in the data space.

In one aspect, the data space may be partitioned into regions, each object belonging to a region based on its location information. A co-located pattern may be categorized as a local pattern or a global pattern based on how that co-located pattern is distributed among the regions, e.g., a relatively even distribution indicates a global pattern, a relatively uneven distribution among regions indicates a local pattern.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards processing a data space such one or more geographic search logs corresponding to geographic search requests, a listing of businesses, and/or a set of GPS-based to discover co-located queries/patterns. In general, a geographic search request is a query comprising one or more keywords that is associated with a location specifying a geographic search area, and thus the search data may be logged as associated fields. Co-located queries are those which are often searched over nearby locations. For example, an example co-located query pattern is {"shopping mall", "parking"}, because people often search for the terms "shopping mall" and "parking" over locations that are geographically close to one another.

While many of the examples described herein are generally directed towards local or global search patterns, it is understood that these are only examples. For example, the concept of local a pattern may corresponds to a neighborhood, city, state, region and so forth, while a global pattern may be by state, country, continent, and so forth rather than "global" actually meaning worldwide. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and search technology in general.

Figure 1:
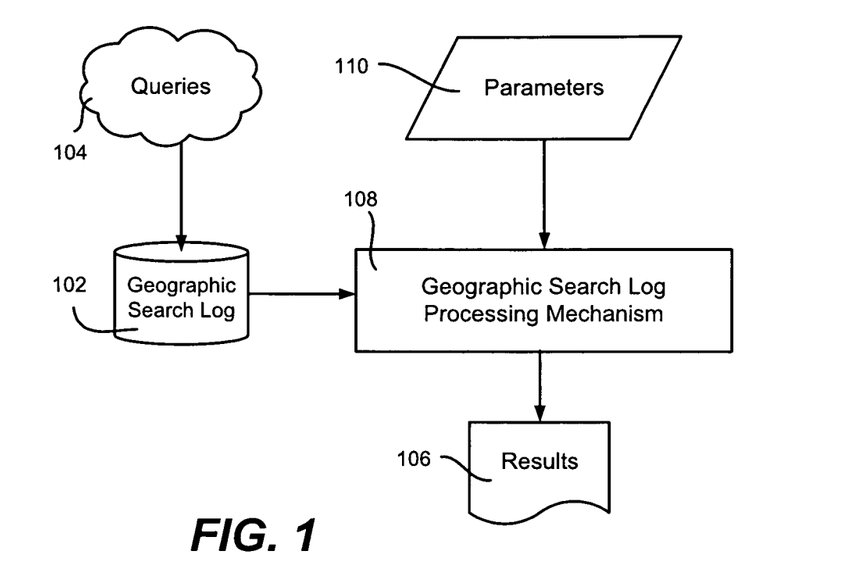
FIG. 1 is a block diagram representing example components related to processing a geographic search log.

Turning to FIG. 1, there is shown a generalized block diagram exemplifying the processing of a geographic search log 102 gathered from past queries 104 into results 106. As generally represented in FIG. 1, a geographic search log processing mechanism 108 is optionally controlled by parameters 110 (such as one or more user-provided thresholds) to provide the set of results 106. Examples of types of such geographic search log processing mechanisms are described below with reference to FIGS. 4 and 5.

In one alternative described below with reference to FIG. 4, co-located query patterns are mined using an existing spatial mining algorithm/mechanism. In another alternative described below with reference to FIG. 5, co-located query patterns that only appear in specific regions are mined using a lattice-based algorithm/mechanism, which divides the geographic space into regions and mines patterns in each region. Also described is a locality measure to categorize patterns into local and global patterns, for example.

To find co-located query patterns, in one implementation a log of geographic search requests is mined, in which the relevant data is recorded within two fields, namely a query field comprising one or more keywords, and a location field that associated with the query to specify the geographic search area, which is referred to as "search-location" or "location" herein. Note that search-locations may be different from the users' location at which they are located when they conduct the search; as used herein queries are considered as being searched at the search-locations, and not the user-locations.

As mentioned above, an example of a co-located query pattern is {"shopping mall", "parking"}, in which the pattern indicates that "shopping mall" and "parking" tend to have nearby search-locations. A more specific example of a co-located query pattern is {"Children's Museum", "Experience Music Project"}; the search-locations of these two queries are geographically close to each other, each being in Seattle (actually, both are popular attractions in downtown Seattle that are located within 250 yards of one another). As can be seen, in summary, a co-located query pattern comprises a set of queries that are frequently associated with nearby search-locations.

Figure 2:
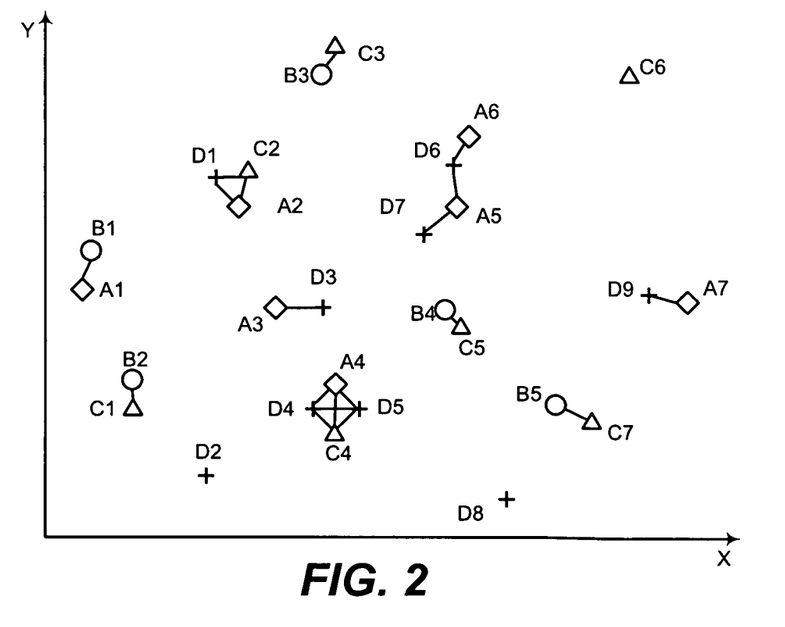
FIG. 2 is a representation of geographic based queries including some co-located query patterns.

FIG. 2 is an area-based representation in which different symbols denote different queries, and different coordinates of the same symbol represent search-locations of a query. In the example of FIG. 2, queries represented by $\{+, \diamond\}$ and $\{\Delta, \bigcirc\}$ are two co-located query patterns, since each pair is often searched for locations within close proximity (e.g., where close is within a threshold distance as described below). As can be readily appreciated, mining such co-located query patterns may be useful with respect to subsequent query handling, such as to provide query suggestions, location recommendations, and/or local advertisements.

By way of example, popular hotel chains are good suggestions for a query such as "hotel" based on patterns mined from logs. In addition, different query suggestions may be provided for the same query issued for different locations. For example, a popular casino-themed hotel may be returned for people searching for Las Vegas hotels, because {"hotel", "XYZ hotel"} is a co-located query pattern in Las Vegas, whereas "WXY" may be suggested for people searching for a hotel in the Hawaii area because {"hotel", "wxy hotel"} is a co-located query pattern in Hawaii; (note that "XYZ" and "wxy" are only generic representations of actual names herein, which in the log are real names of actual hotels/chains).

Similarly, location recommendation aims to provide users additional local information to facilitate their exploration of a place, especially an unfamiliar one. For example, when users search "Time Square" for New York, the top queries that are frequently searched across New York, such as "Twin Tower", "Ground Zero", and "World Trade Center" may be returned as being famous landmarks at the search location. Additionally, co-located query patterns can help advertisers to better understand the interests of local search users, e.g., a query pattern such as {"car repair", "CarMFR123"} shows that users in this region are probably more interested in finding car repairing services for that particular car company (an actual company instead of "CarMFR123" is what is logged) than other car companies.

In one aspect, for discovery purposes, geographic queries that are often associated with nearby search locations may be mapped to a spatial co-location pattern mining problem. Note that spatial co-location pattern mining is considered an important problem in spatial data mining.

To this end, let $F=\{f_1, \ldots, f_m\}$ be a set of spatial types and $O=\{o_1, \ldots, o_m\}$ be a set of objects of F, in which each object (instance) is represented by <object id, location, spatial type>. A neighbor relation R between two objects is assumed to be available to determine close geographic proximity of objects. Two objects $o_1$ and $o_2$ are a pair of neighbors, if $R(o_1, o_2)$. For a set of objects $\{o_1, \ldots, o_k\}$, if $R(o_1, o_j)$, $\forall i,j \in \{1, \ldots, k\}$, $\{o_1, \ldots, o_k\}$ is a neighbor-set, denoted as $R\{o_1, \ldots, o_k\}$. Neighbor-sets can be visualized in a graph, e.g., in which vertexes denote spatial objects and pairs of neighbors are connected with edges, whereby each neighbor-set forms a clique in a graph.

For a neighbor-set $\{o_1, \ldots, o_k\}$, if $\forall i \in \{1, \ldots k\}$, $o_i$ is an object of $f_i$, $\{o_1, \ldots, o_k\}$ is a neighbor-set of the set of types $\{f_i, \ldots, f_k\}$. For a set of spatial types $C=\{f_i, \ldots, f_k\}$, $C \subseteq F$, a participation ratio pr(C, f) of a type f in C is defined as the portion of f's objects in which there exists an object of each of the other k−1 types in C, so that the k spatial objects form a neighbor-set of C.

Participation ratio measures the probability of f's objects being observed in a neighbor-set among objects of other types in C. The participation index $pi(C)=\min_{f \in C}\{pr(C, f)\}$ measures the least probability of any type in C to be observed in a neighbor-set with objects of other types in C. A set of spatial types C is thus a spatial co-location pattern if pi(C) is no less than a given participation index threshold; in general, a spatial co-location pattern is a set of spatial types whose objects are often located in close geographic (or other) proximity.

When viewing geographic queries as spatial types and search-locations of a query as objects of a spatial type, queries that are often associated with nearby search-locations are co-location patterns, and such query sets are referred to as co-located query patterns. Note that there is a significant difference between spatial co-location pattern mining and association rule mining, whereby the problem is mapped to spatial co-location pattern mining instead of association rule mining.

More particularly, definitions in association rule mining include that $I=\{i_1, \ldots, i_m\}$, which represents a set of items, and $T=\{T_1, \ldots, T_n\}$, which represents a set of transactions, where $T_i$ is a transaction that is a subset of the items in I. The support of an item set Y, $Y \subseteq I$, is defined as the number of transactions containing Y in T. In addition, the confidence of $X \rightarrow Y$, where X and Y are two item sets, is the portion of transactions containing X that also contain Y. Based on these definitions, $X \rightarrow Y$ is defined as an association rule if supports of both X and Y are no less than a support threshold s and the confidence of $X \rightarrow Y$ is no less than a confidence threshold.

A straightforward approach is to consider that spatial co-location patterns can be translated into association rules in association rule mining, e.g., a spatial type is an item, a maximal neighbor-set (a neighbor-set not contained in other larger neighbor-sets) is a transaction, a participation index is similar to confidence, and association is spatial co-location. However, this mapping has problems.

Figure 3:
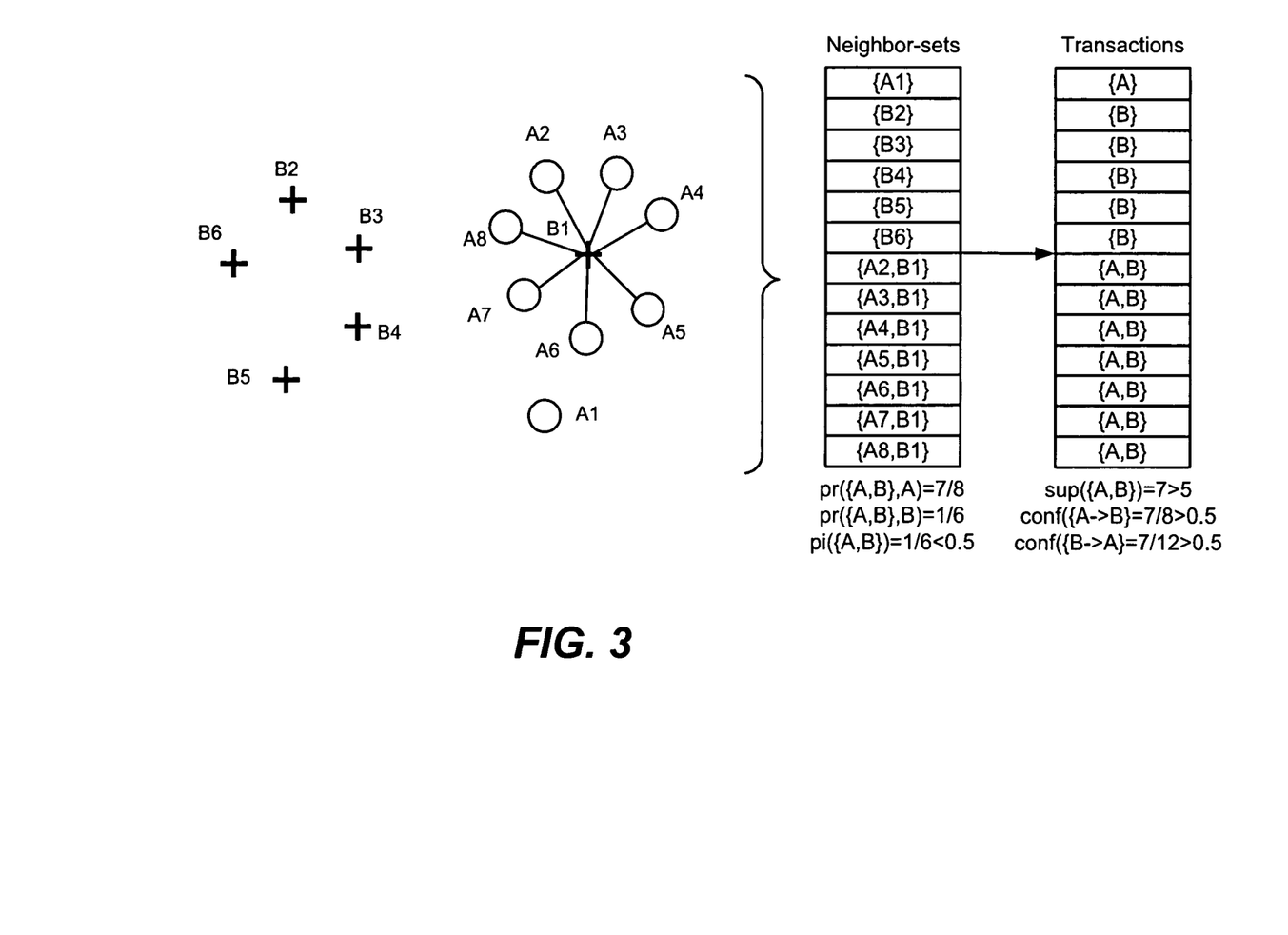
FIG. 3 is a representation of a comparison between co-location patterns and association rules.

FIG. 3 shows an example that illustrates a problem with the association rule mining approach. According to the above translation, the maximal neighbor sets and the translated transactions are shown in FIG. 3. Given a support threshold of five (5) and a confidence threshold of 0.5, $A \rightarrow B$ and $B \rightarrow A$ are association rules.

If considering association rules in determining co-location patterns, {A, B} will be considered a co-location pattern. However, in FIG. 3, most objects of type A are located to the right, while most objects of type B are located to the left; A and B actually do not tend to locate together and therefore should not be considered a co-location pattern. In contrast, with the definitions described above with respect to spatial co-location pattern mining, {A, B} is correctly identified as not being a co-location pattern, because the participation index pi({A, B})=1/6<0.5. In general this is because in association rule mining, transactions are independent, e.g., each time an item i occurs in a transaction, it is considered to be a distinct object of i, and therefore, each contributes to the confidence score of rules $i \rightarrow *$. In the example of FIG. 3, conf($A \rightarrow B$)=7/8 because the As in the seven {A, B} transactions are viewed as distinct and counted in confidence counting. In comparison, in co-location pattern mining, different transactions may share the same object of a spatial type. Therefore, the same objects of a type only contribute once in the participation ratio and participation index. For example, $pr(\{A, B\}, B)=1/6$ in FIG. 3 because the seven neighbor sets of $\{A, B\}$ contain the same B1 location.

In one example implementation, a geographic search is defined as a query q and a search-location l in terms of a latitude and longitude pair l={lat, lng}. Most commercial geographic search engines support both textual input and map navigation modes. Thus, users may specify a search-location using text, such as a street address, postal code, and even a phone number, or by navigating a map to the interested place. Usually, a search-location specified by a user in either form is converted to a latitude and longitude pair by a search engine to facilitate distance-based ranking of search results. In one implementation described herein, the latitude and longitude pair form of a search-location are directly used.

To this end, let $Q=\{q_1, \ldots, q_m\}$ be a set of geographic queries, and let $L=\{l_1, \ldots, l_n\}$ be a set of search-locations of the query set Q, where l∈L is a search-location of a query in Q. Euclidean distance may be used to define the neighbor relation R between two search locations, namely if $d(l_i, l_j)<\epsilon$, $R(l_i, l_j)$ where $\epsilon$ is a neighbor distance threshold. That is, if the Euclidean distance between two search locations is smaller than the threshold, the two search locations are considered to be a pair of neighbors. Then, for a set of search-locations $\{l_1, \ldots, l_k\}$, $R(l_1, \ldots, l_k)$ denotes that $\{l_1, \ldots, l_k\}$ is a neighbor-set, in which the Euclidean distances between the pairs of search locations are smaller than $\epsilon$.

FIG. 2 exemplifies these aspects, in which $\{A_1,B_1\}$, $\{A_2,C_2,D_1\}$, and $\{A_4,C_4,D_4,D_5\}$ are among some of the location neighbor-sets, for example, because each set forms a clique. Let $C=\{q_1, \ldots, q_k\}$ be a set of queries, $C \subseteq Q$. Let $L_i$ be the search-location set of $q_i$ in L, $L_i \subset L$, $i \in \{1, \ldots, k\}$. $L'_i \subseteq L_i$, and $\forall l \in L'_i$, providing:

$$\forall j \in \{1, \ldots, k\} \setminus \{i\}, \exists l_j \in L_j, s.t., \mathcal{R}(l_1, \ldots l_{i-1}, l, l_{i+1}, \ldots, l_k). \quad (1)$$

That is, $L'_i$ is a subset of query $q_i$'s search-location set $L_i$. For each location l in $L'_i$, there exists a search location of each of the other k−1 queries in C, so that the k search locations $\{l_1, \ldots, l_{i-1}, l, l_{i+1}, \ldots, l_k\}$ form a neighbor-set. Then, the participation ratio $pr(C, q_i)$ is defined as:

$$pr(C, q_i) = \frac{|L'_i|}{|L_i|}. \quad (2)$$

For example, in FIG. 2, the neighbor-sets of $\{A,D\}$ are $\{A_2,D_1\}$, $\{A_3,D_3\}$, $\{A_4,D_4\}$, $\{A_4,D_5\}$, $\{A_5,D_6\}$, $\{A_5,D_7\}$, $\{A_6,D_6\}$, $\{A_7,D_9\}$. Among the seven search-locations of A, six are in the neighbor-sets of $\{A,D\}$. Thus, the participation ratio $pr(\{A,D\}, A)=6/7$. As another example, $pr(\{A,C,D\}, D)=3/9$, because among mined search locations represented by D, $D_1$, $D_4$, $D_5$ are in neighbor-sets $\{A_2,C_2,D_1\}$, $\{A_4,C_4,D_4\}$, $\{A_4,C_4,D_5\}$ of $\{A,C,D\}$. The participation index $pi(C)=\min_{q_i \in C}\{pr(C, q_i)\}$ measures how frequently the query set C is searched in neighbor-sets. As can be seen in FIG. 2, $pr(\{A,D\},A)=6/7$ and $pr(\{A,D\}, D)=7/9$; thus, $pi(\{A,D\})=\min(6/7, 7/9)=7/9$. Similarly, $pi(\{A,C,D\})=2/7$ because $pr(\{A,C,D\}, A)=2/7$, $pr(\{A,C,D\},C)=2/7$, and $pr(\{A,C,D\}, D)=3/9$.

With the measured participation index, a co-located query pattern may be defined to be a query set C whose participation index is not less than a (user-specified or default) participation index threshold min_pi. For example, in FIG. 2, given a participation index threshold 0.5, $pi(\{A,D\})=7/9>0.5$, whereby $\{A,D\}$ is a co-located query pattern. However, $\{A,C,D\}$ is not a co-located query pattern because $pi(\{A,C,D\})=2/7<0.5$.

As described above, when considering co-located query pattern discovery, different approaches to discovering co-located query patterns using typical geographic search logs may be used. One basic approach, shown in the example framework of FIG. 4, may be used, however a second approach (described with respect to FIG. 5) generally overcomes certain shortcomings of the basic approach.

Figure 4:
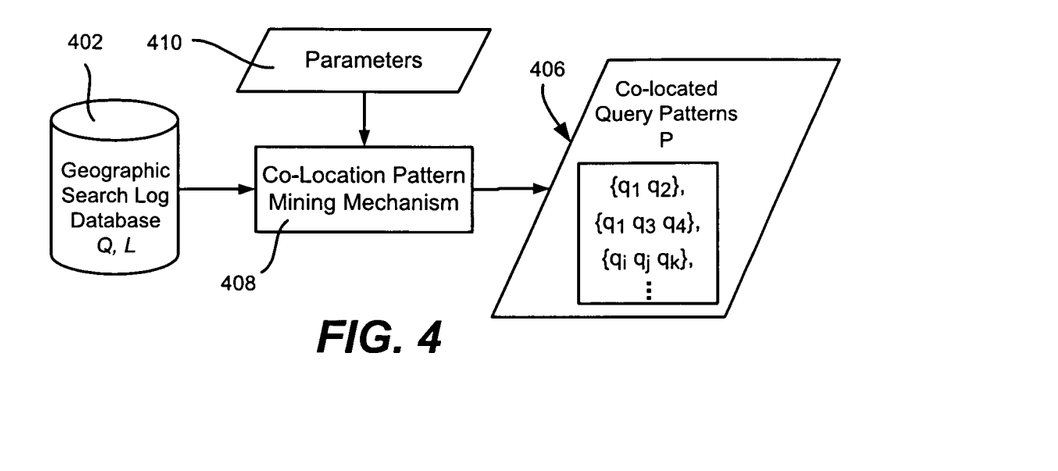
FIG. 4 a block diagram representing an example framework of a basic approach to process a geographic search log.

In general, the basic approach represented in FIG. 4 uses an input query set Q and its associated search-locations L, which can be obtained from geographic search logs a represented by a log 402. This approach takes as input parameters 410: a set of queries $Q=\{q_1, \ldots, q_m\}$; a set of search-locations $L=\{l_1, \ldots, l_n\}$ of Q, in which each location l={lat, lng} is a search-location of a query in Q; a neighbor distance threshold $\epsilon$ to decide Euclidean neighbor relation R; and a participation index threshold min_pi. With these input parameters, the basic co-located query pattern discovery approach, as exemplified as the co-location pattern mining mechanism 408 (corresponding to the geographic search log processing mechanism 108 of FIG. 1), outputs a co-located query pattern set P as results 408. The participation index of each pattern C in P satisfies pi(C)>min_pi.

In general, this basic approach utilizes a spatial co-location pattern mining algorithm to discover co-located query patterns. It is known that both participation ratio and participation index are monotonic with respect to the number of spatial types in co-location patterns (size of co-location patterns). That is, for co-location patterns C and C', if $C \subset C'$, then, for each spatial type $f \in C$, $pr(C, f) \geq pr(C', f)$. Further, $pi(C) \geq pi(C')$. The monotonic property, also referred to as the Apriori property, ensures that if a spatial type set is not a co-location pattern, its superset also cannot be co-location patterns. According to this property, a co-location pattern mining algorithm is Apriori-based. It generates the pair-wise neighbors that satisfy geographic proximity. These pair-wise neighbors are then used to calculate participation index scores of type pairs. Type pairs with participation index≥min_pi are size-2 co-location patterns. Then, the following iteration begins. Size-k+1 candidate patterns are generated by joining size-k co-location patterns in an Apriori-based candidate generation process. Each sizek+1 candidate pattern $P_3$ is generated from two size-k co-location patterns $P_1$ and $P_2$ with the first k−1 common spatial types. The first k−1 types of the generated candidate $P_3$ are the same as the first k−1 types of $P_1$ and $P_2$. The last two types of $P_3$ are the last types of $P_1$ and $P_2$. After that, neighbor-set collection of each size-k candidate $P_3$ is generated by joining neighbor-set collections of $P_1$ and $P_2$. Using the neighbor-set collection of $P_3$ to calculate participation index of $P_3$, if $pi(P_3) \geq min\_pi$, $P_3$ is validated to be a size-k+1 co-location pattern. This iteration ends when there is only one size-k co-location pattern discovered. This algorithm is correct and complete. This basic approach can discover queries that are co-located in the space covering the whole search-location set L.

However, some queries, although not co-located globally, tend to be co-located in some specific regions. By way of a previous example {"Children's Museum", "Experience Music Project"} are actually not discovered as co-located queries by the basic approach, because there are a lot of Children's Museums (e.g., in the United States) while the Experience Music Project is only located in Seattle. Although such queries are not globally co-located, considering them as co-located provides benefits in real applications, and may be more important than global patterns, which are often common knowledge unlike local patterns that are of interest to people, particularly those unfamiliar with a region.

To address such global versus regional aspects, a lattice-based pattern discovery approach may be implemented. More particularly, co-located query patterns in regions and locality degree are employed, as described below.

To this end, let S be a geographic space under search, which is partitioned into a set of t disjoint rectangular regions $S=R_1 \cap R_2 \cap, \ldots, \cap R_t$, wherein in general, $R_i$ denotes a region of S, $R_i \subseteq S$. The partitioning of S into regions in this example requires that the regions of S be disjoint, that is, $\forall i,j \in \{1, \ldots, t\}; i \neq j, R_i \cap R_j = 0$. For example, the geographic space of the entire world is $[-90, 90] \times [-180, 180]$ in terms of latitude and longitude degrees, and can be partitioned into four regions, namely $\{[90, 0] \times [-180, 0), [-90, 0] \times (0, 180], (0, 90] \times [-180; 0], (0, 90] \times (0, 180]\}$. The example implementation also requires that a region be wider than the given distance threshold used to define the neighbor relation R.

Let L be the search-location set of the query set Q over the geographic space S under search. S is partitioned into regions $\{R_1, \ldots, R_t\}$. The participation ratio $pr(C, q|R)$ of a query q in a query set C in a region R is the portion of q's search-location set in R that are in neighbor-sets of C; it indicates, wherever q is searched in region R, a probability that other queries in C are also searched in a neighbor-set in R, of $pr(C, q|R)$.

As set forth above, Equation 2 indicates $$pr(C, q_i) = \frac{|L'_i|}{|L_i|}$$

where $L_i$ is the search location set of $q_i$ in L and $L'_i$ is a subset of $L_i$. For each location l in $L'_i$, there exists a search-location of each of the other k−1 queries in C, so that the k search-locations form a neighbor-set. Correspondingly, let $L_{ij}$ denote the subset of the location set $L_i$ falling in region $R_j$. Let $L'_{ij}$ denote a subset of $L_{ij}$. For each location l in $L'_{ij}$, there exists a search location of each of the other k−1 queries in C, in region $R_j$, so that the k search-locations form a neighbor-set. Then, $pr(C, q_i|R_j)$ can be written as:

$$pr(C, q_i | R_j) = \frac{|L'_{ij}|}{|L_{ij}|}. \quad (3)$$

Similarly, the participation index $pi(C|R)$ of a query set C in a region R is $\min_{f \in C}\{pr(C, f|R)\}$. It indicates that, wherever a query is searched in R, the probability of all other queries in C also searched in a neighbor-set in R is at least $pi(C|R)$. Then, a query set C is a co-located query pattern in a region R of S, if $pi(C|R) \geq \min\_pi$. As long as a region is large enough, the number of neighbor-sets across regions is much smaller than the number of neighbor-sets in regions, whereby neighbor-sets across regions may be ignored (or otherwise processed). Then, $pr(C, q_i)$ in the entire geographic space is approximated using all $pr(C, q_i|R)$ in regions. For example a 0.5 kilometer neighbor distance threshold may be used to mine patterns in geographic search, with 10-100 kilometers as the width of a region. Regardless of neighbor-sets across regions, this provides:

$$|L'_i| = \sum_{R_j \in S} |L'_{ij}| \quad (4)$$

That is, locations of $q_i$ in L where the queries in C are searched in a neighbor-set is the sum of such locations of $q_i$ in all regions. In addition, $$|L_i| = \sum_{R_j \in S} |L_{ij}|. \quad (5)$$

Then, $pr(C|R_j)$ is approximated by:

$$pr(C, q_i) = \frac{|L'_i|}{|L_i|} \quad (6)$$

$$= \frac{\sum_{R_j \in S} |L'_{ij}|}{\sum_{R_j \in S} |L_{ij}|}$$

$$= \frac{\sum_{\forall R_j \in S} |L'_{ij}|}{|L_i|}.$$

Note that Equation 6 also may be deduced using marginal probability. According to the probability meaning of $pr(C)$, wherever query $q_i$ is searched, the probability that all other queries in C are also searched in a neighbor-set is the sum of the probability of $q_i$ searched in each region $R_j$ times the probability of all other queries in C that are also searched in a neighbor-set when $q_i$ is searched in $R_j$. The probability of $q_i$ being searched in region $R_j$ is $$\frac{|L_{ij}|}{|L_i|}.$$

Thus, $$pr(C, q_i) = \quad (7)$$

$$\sum_{\forall R_j \in S} \frac{|L_{ij}|}{|L_i|} * pr(C, q_i | R_j) = \sum_{\forall R_j \in S} \frac{|L_{ij}|}{|L_i|} * pr(C, q_i | R_j) = \frac{\sum_{\forall R_j \in S} |L'_{ij}|}{|L_i|}.$$

This is same as $Pr(C, q_i)$ obtained in Equation 6.

Considering next an aspect directed towards the locality degree of a pattern, consideration may be given to which of the patterns are local patterns and which are global, such as for appropriate usage in different applications. In general, local patterns apply to specific locations, as they characterize local phenomenon and are not applicable to a global scale. In contrast, global patterns are common phenomenon among many places. For example, {"Disney Land", "EPCOT"} is a local pattern, whereas {"shopping mall", "parking"} is a global pattern.

Many users may consider co-located patterns in regions as local patterns, however they can be global patterns. For example, in many regions, {"shopping mall", "parking"} is discovered as a co-located query pattern, but it is actually a common pattern. A reason is that for a pattern C in a region R, a high pi(C|R) only indicates queries in C tend to be searched closely in R, which does not imply that queries in C do not tend to be co-located in other regions.

Entropy may be used to define the locality degree of a pattern in regions. To this end, let $N=\{N_1, \ldots, N_t\}$ denote the neighbor-set collection of a pattern C, where $N_j$ is the neighbor-set collection of C in region $R_j$. Neighbor-sets $N_j$ of the pattern C in $R_j$ are generated during the process of C being identified as a co-located query pattern in $R_j$. $|N_j|$ can be calculated accordingly. There is no overlap among $N_1, \ldots, N_t$, thus $$|N| = \sum_{\forall R_j \in S} |N_j|. \quad (8)$$

Then, the locality degree of a pattern H(C) is:

$$H(C) = -\sum_{\forall R_j \in s} \frac{|N_j|}{|N|} * \log\left(\frac{|N_j|}{|N|}\right). \quad (9)$$

Note that $$\frac{|N_j|}{|N|}$$

indicates the probability that the pattern C occurs in region $R_j$. Locality degree of a pattern C measures the uncertainty of C searched in regions. A high locality degree means that a pattern appears evenly in regions, while a low locality degree indicates that a pattern sticks to a few specific regions. As a result, patterns with high locality degrees may be considered global patterns, while those with low locality degrees are local ones. Based on locality degree, a pattern in regions is considered to be global when its locality degree is greater than a given locality degree threshold, otherwise it is considered to be local. Then, for example, local patterns can be used to provide location-sensitive recommendations, while global patterns indicate common user behaviors.

Figure 5:
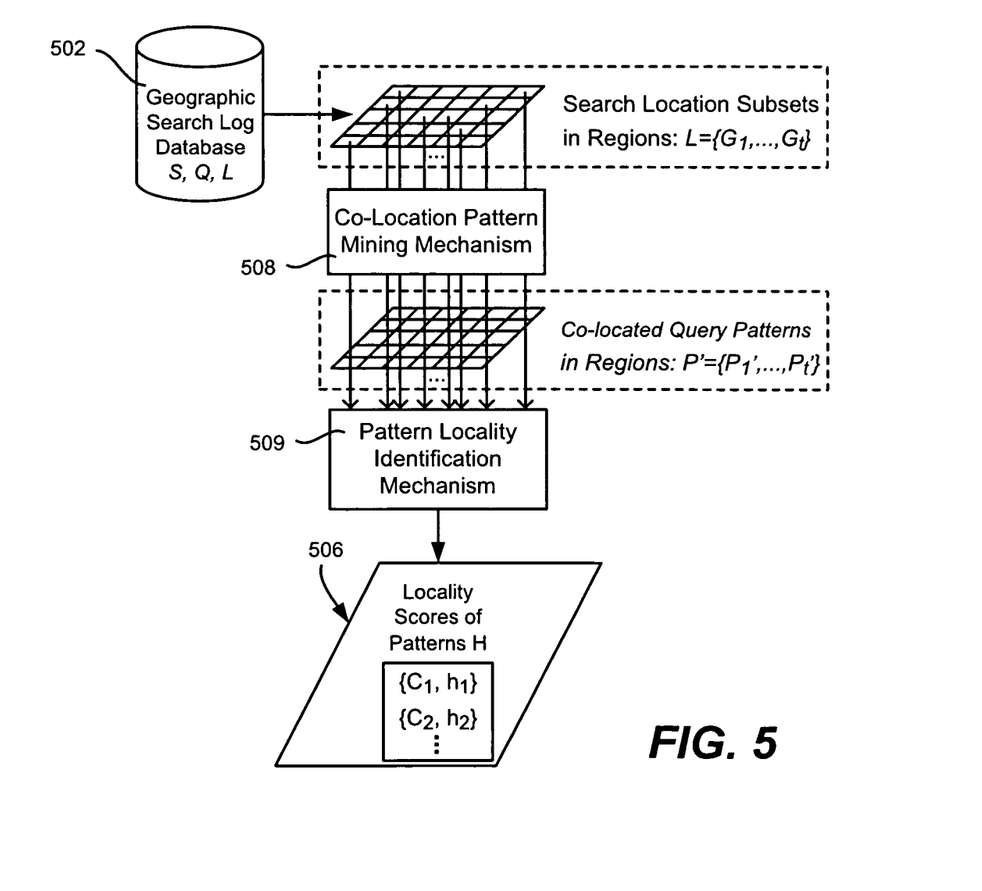
FIG. 5 a block diagram representing an example framework of a lattice-based approach to process a geographic search log.

An example framework of a lattice based mining approach is shown in FIG. 5. Note that the components of FIG. 9 correspond to those of FIG. 1, with the co-location pattern mining mechanism 508 and the pattern locality identification mechanism 509 corresponding to the processing mechanism 108 of FIG. 1. In one example implementation, the lattice based approach takes the following input parameters 510:

geographic space S under search,
a set of queries $Q=\{q_1, \ldots, q_{mg}\}$,
a set of search-locations $L=\{l_1, \ldots, l_n\}$ of Q over S, in which each location l={lat; lng} is a search location of a query in Q, l∈S,
a neighbor distance threshold ∈ to decide neighbor relationship R,
a participation index threshold min_pi, and
cell width w to partition S into equal-sized rectangular regions $S=\{R_1, \ldots, R_t\}$.

The approach outputs as results 506 co-located query pattern sets in t regions $P'=\{P'_1, \ldots, P'_t\}$, in which $P'_i$ is the set of patterns in the region $R_i$ with the participation index of each pattern C in $P'_i$ satisfying $pi(C|R_i)>$min_pi, and the locality degrees H of patterns in P'.

Figure 6:
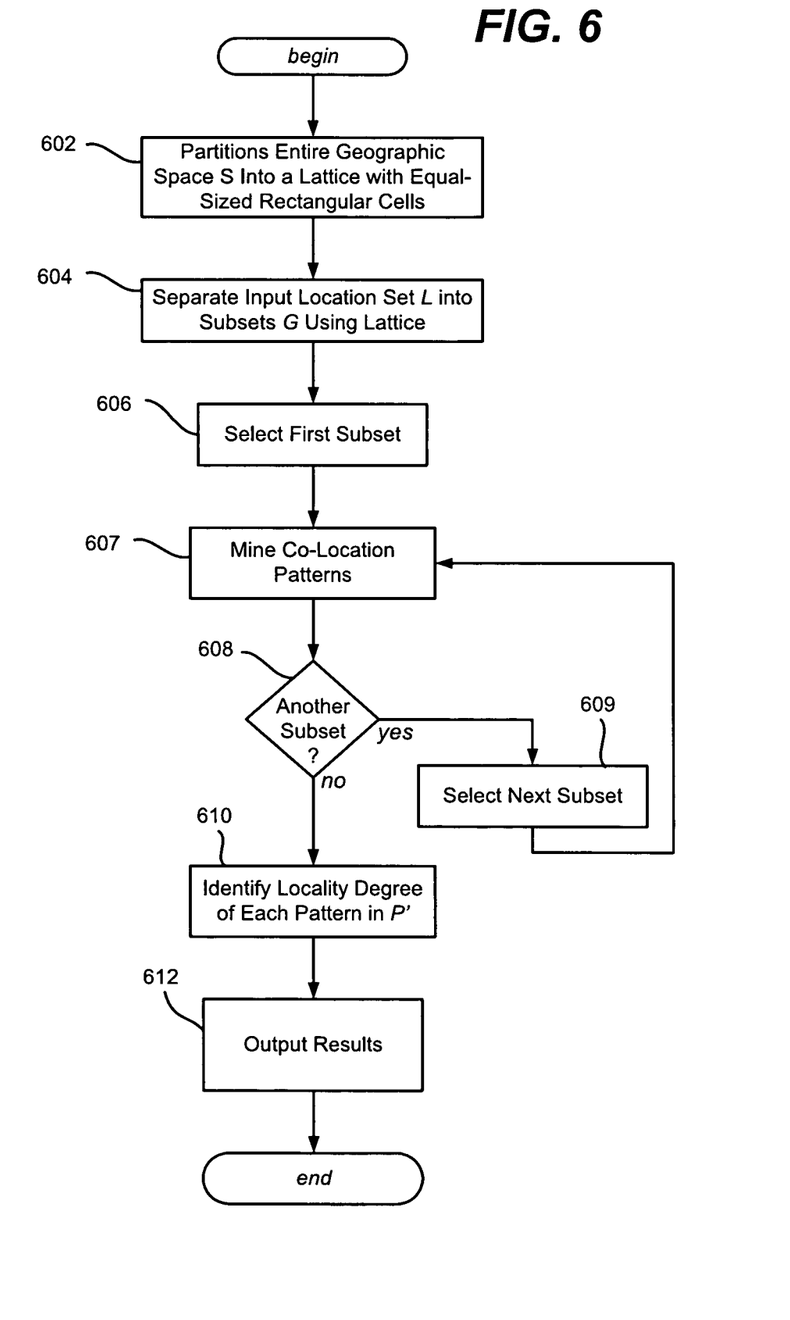
FIG. 6 is a flow diagram representing example steps that may be taken in processing a geographic search log.

As represented in FIG. 6 and in Algorithm 1 (below), the lattice-based co-located query pattern mining algorithm has a number of general steps. A first step 602 partitions the entire geographic space S into a lattice with equal-sized rectangular cells $\{R_1, \ldots, R_t\}$ (Step 1 and Step 2 in Algorithm 1). Note that in other implementations, the cells need not be equal, nor based on size, e.g., a cell may be defined by a number of entries therein. In this example, each cell is a region with a cell width input as w.

Step 604 separates the input location set L into subsets $\{G_1, \ldots, ; G_t\}$ using the lattice. $G_j$ is in region $R_j$, j∈{1, ..., t}. $G_j$ comprises location subsets of the queries in region $R_j$, i.e., $G_j=\{L_{1j}, \ldots, ; L_{mj}\}$, where $L_{ij}$ is the subset of locations $L_i$ of $q_i$ in $R_j$. Note that step 604 may use the basic co-located query pattern mining approach of FIG. 4 (described above) to mine query patterns in each region.

Steps 606 selects the first subset to process, after which steps 607-609 repeat until the patterns in the full set of regions are discovered. Note that for purposes of simplicity in FIG. 6, the patterns in each subset G are generally represented as being mined sequentially; however it is feasible to mine some or all of the patterns in each subset in parallel. When mining patterns in $R_i$, (step 607), the input location set is $G_i$ and the input query set is Q. The output comprises the co-located query pattern $P'_i$ in $R_i$. The resulting pattern set in the regions is $P'=\{P'_1, \ldots, P'_t\}$.

After the patterns $P'=\{P'_1, \ldots, P'_t\}$ in the regions of S are obtained, step 610 identifies the locality degree of each unique pattern in P' using Equation 9 (corresponding to Step 5 in Algorithm 1). In other words, after the patterns in the subsets (the log data in cells) are mined, locality degree of the patterns is calculated. The neighbor-sets of each pattern, which are used to calculate the locality degree, have been obtained as described above.

Pseudocode of example Lattice based co-located query pattern discovery algorithm (Algorithm 1) is set forth below:

---
Algorithm 1 Lattice based co-located query pattern discovery algorithm
---

Input
    S, Q, L, ∈, min_pi, w
Output
    P' = {$P_1'$, ..., $P_t'$}, H
Variables
    S = {$R_1$, ..., $R_t$}, L = {$G_1$, ..., $G_t$}
Method
    1: {$R_1$, ..., $R_t$}=partition_space_into_regions(S, w);
    2: {$G_1$, ..., $G_t$}=get_location_sets_in_regions(L,{$R_1$, ..., $R_t$});
    3: for all (location subsets$G_i$ ∈ L) do
    4:    $P_i'$=mine_co-location_patterns(Q, $G_i$, ∈, min_pi);
    5: H=identify_pattern_locality({$P_1'$, ..., $P_t'$});
    6: return P'={$P_1'$, ..., $P_t'$}, H;

---

Experimental results show that the lattice-based approach achieves higher performance than the basic approach in the number of patterns, the quality of patterns, and the proportion of local patterns. Comparing the basic and the lattice based mining approaches, the pattern set discovered by the lattice-based method is a superset of that discovered by the basic method, that is, the patterns discovered by the basic method are also discovered by the lattice based method. According to Equation 6:

$$pr(C, q_i) = \frac{\sum_{R_j \in S} |L'_{ij}|}{\sum_{R_j \in S} |L_{ij}|},$$

regardless of neighbor-sets across regions. It has the property:

$$\min_{R_j \in S} \frac{|L'_{ij}|}{|L_{ij}|} \leq \frac{\sum_{R_j \in S} |L'_{ij}|}{\sum_{R_j \in S} |L_{ij}|} \leq \max_{R_j \in S} \frac{|L'_{ij}|}{|L_{ij}|}. \quad (10)$$

With this property, there is provided:

$$\min_{R_j \in S} pr(C, q_i | R_j) \leq pr(C, q_i) \leq \max_{R_j \in S} pr(C, q_i | R_j), \quad (11)$$

and correspondingly, $$\min_{R_j \in S} pi(C | R_j) \leq pi(C) \leq \max_{R_j \in S} pi(C | R_j). \quad (12)$$

Therefore, if in all of the regions $R_j$, the participation index $pi(C, R_j)$ of a pattern C is smaller than min_pi, pi(C) will be also smaller than min_pi. Thus, the pattern set discovered by the lattice based method is a superset of that discovered by the basic method. Further, in the lattice-based method, the locality degree of each pattern is calculated to determine whether it is a global or local pattern. In contrast, in the basic approach, locality degrees of patterns cannot be easily calculated, and thus there is not a way to determine which patterns discovered by the basic method are local and which are global. Note that while it may appear that all patterns discovered by the basic method are global because the participation index scores of patterns generated by this method are no less than min_pi in the entire space, this is not correct, as patterns generated by the basic approach can be local. For example, {"Disney Land", "EPCOT"} is a pattern found by the basic method. However, it is local to Florida as opposed to global to the United States because C can achieve a high pi(C) by being frequently searched in a small number of regions. If a query in C occurs when other queries in C also occur nearby, pi (C) will be high; in the {"Disney Land", "EPCOT"} example, the queries "Disney Land" and "EPCOT" are mostly searched in a few regions in Florida, and in these regions, they tend to be together. Thus, the pattern has a high pi(C) as a pattern in the entire space; this is different from the example of {"shopping mall", "parking"}, which shows up in many regions. Note further that the basic approach is an extreme case of the lattice based approach, essentially in that the "region" of the basic approach is the entire geographic space under search.

Exemplary Operating Environment

Figure 7:
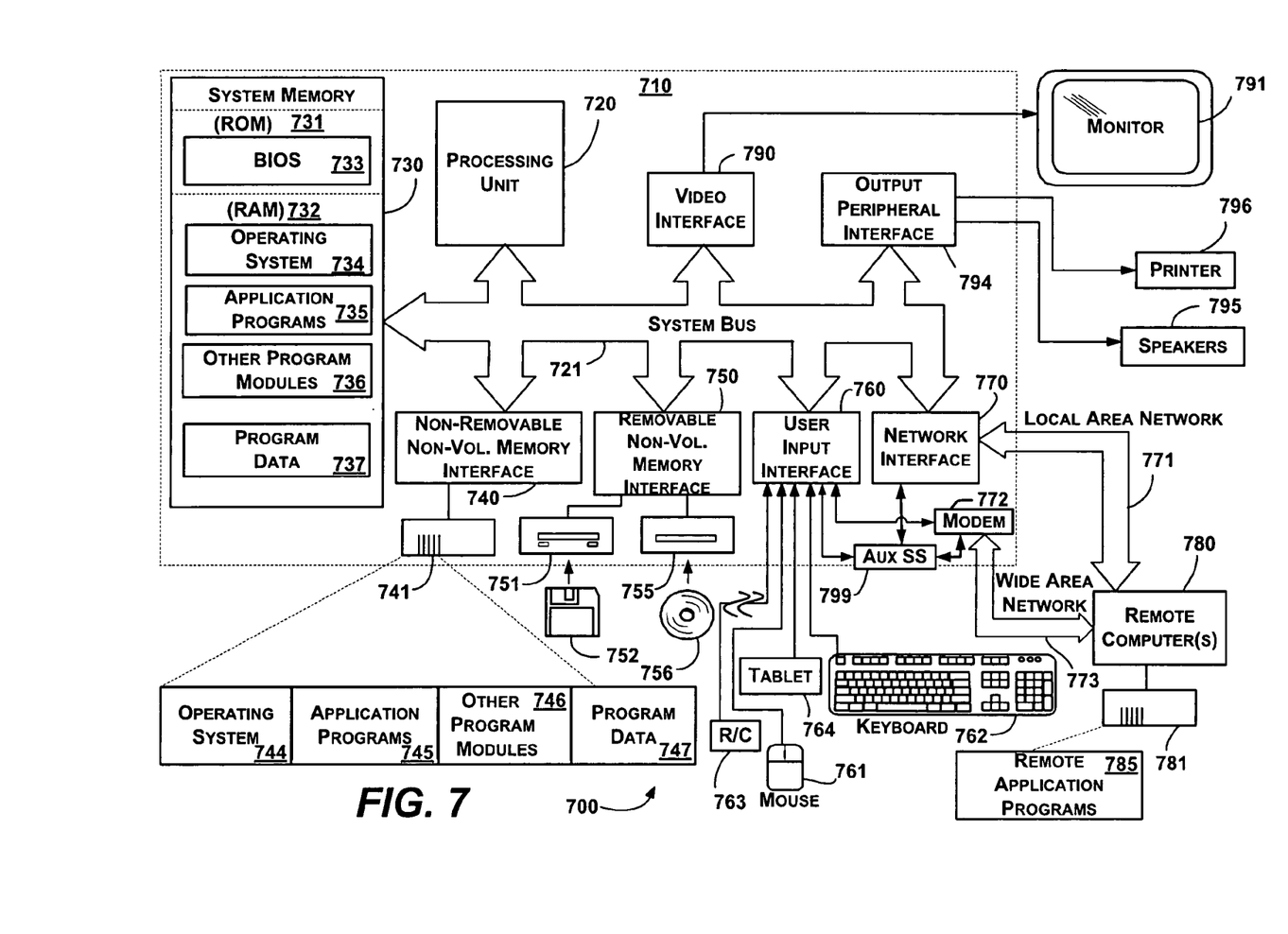
FIG. 7 shows an illustrative example of a computing environment into which various aspects of the present invention may be incorporated.

FIG. 7 illustrates an example of a suitable computing system environment 700 on which the examples of FIGS. 1-6 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component 774 such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
    processing a data store of geographic search requests, each geographic search request comprising query terms previously submitted by a user, from a user location, and being represented by an object having type data and location data, the type data being indicative of a keyword contained in the geographic search request and identifying a subject matter of the geographic search request, and the location data specifying a search location contained in the geographic search request, the search location being independent of the user location from which the user submitted the geographic search request;
    identifying one or more co-located patterns in the geographic search requests by determining whether different objects, each of the different objects representing a different one of the geographic search requests, have different type data and comprise a co-located pattern in a given region based on how often geographic search requests represented by sets of the different objects occur in the data store and have location data that specifies locations within a threshold geographic distance of one another;

storing the identified co-located patterns, each identified co-located pattern associating a set of keywords from a plurality of the geographic search requests in the data store; and generating search results for an input geographic search request, comprising:
   determining that the given region is identified by location data in the input geographic search request;
   matching a keyword in the input geographic search request to a first keyword in a given one of the identified co-located patterns for the given region; and
   generating the search results based at least in part on a second keyword identified from the given co-located pattern.

2. The method of claim 1 wherein processing the data store comprises processing a geographic search log.

3. The method of claim 1 wherein the data store corresponds to a geographic space, and wherein processing the data store comprises partitioning the geographic space into a plurality of regions, and associating each object with a region of the plurality of regions.

4. The method of claim 3 and further comprising categorizing the one or more co-located patterns as a local pattern or a global pattern based on the association of the objects with the regions.

5. The method of claim 4 wherein categorizing the one or more co-located patterns comprises, for each co-located pattern, categorizing the co-located pattern as a local pattern or a global pattern based on determining a pattern distribution of the co-located pattern among the plurality of regions.

6. The method of claim 1 wherein determining whether the different types of objects comprise a co-located pattern comprises computing a participation ratio based upon a probability of an object type of being observed among objects of other types.

7. The method of claim 1 wherein determining whether the different objects comprise a co-located pattern comprises computing a participation index corresponding to a least probability of any object type being observed with objects of other types.

8. The method of claim 7 wherein determining whether the different objects comprise a co-located pattern comprises evaluating the participation index against a participation index threshold.

9. A system comprising:
a computer processor being a functional component of the system; and
instructions which, when executed by the computer processor, configure the system to:
   process a search log of previously submitted geographic search requests by evaluating geographic distances between different objects in the search log, each object representing a geographic search request, previously submitted to a search engine, that searches for a subject matter in a geographic location, each object having a keyword identifying the subject matter of the previously submitted geographic search request and location data identifying the geographic location in the geographic search request;
   identify co-located patterns in the search log of previously submitted geographic search requests based on how often sets of the objects, that are closely located based on the location data, appear in the search log of previously submitted geographic search requests; and
   store the co-located patterns, each co-located pattern associating the keywords of a plurality of different ones of the previously submitted geographic search requests.

10. The system of claim 9 wherein the instructions configure the system to use a threshold distance parameter to determine whether two or more objects are closely-located objects based on the geographic distance of those objects.

11. The system of claim 9 wherein the instructions configure the system to use a participation threshold parameter to determine whether each set is a co-located pattern.

12. The system of claim 9 wherein the instructions configure the system to:
   receive an input geographic search request; and
   generate search results, for the input geographic search request, based at least in part on the keywords associated by one of the co-located patterns.

13. The system of claim 9 wherein the instructions configure the system to partition the search log into a plurality of regions, and associate each object with a region based on the location data associated with that object.

14. The system of claim 13 wherein the instructions configure the system to categorize a co-located pattern as a local pattern or a global pattern based on distribution of that pattern among a plurality of regions.

15. One or more computer storage media having computer-executable instructions, executable by a computer with a processor, which when executed perform steps, comprising:
   partitioning, with the processor, a geographic space into a lattice of regions;
   separating, with the processor, objects having associated location information into subsets based upon the lattice and the location information of each object, each object representing a geographic search request comprising query terms previously submitted by a user, obtained from a search log of previously-submitted geographic search requests, that has a keyword corresponding to a content of the geographic search request and the location information corresponding to a geographic region specified in the query terms of the previously submitted geographic search request, the geographic region being independent of a location of the user that submitted the geographic search request; and
   processing the subsets to mine co-location patterns, each co-location pattern comprising a set of keywords corresponding to content from a plurality of different geographic search requests that are within a given distance of one another based on the location information.

16. The one or more computer storage media of claim 15 wherein processing the subsets to mine the co-location patterns comprises determining which objects of different types are within a threshold distance of one another.

17. The one or more computer storage media of claim 15 wherein processing the subsets to mine the co-location patterns comprises determining how often objects of different types are within a threshold distance of one another.

18. The one or more computer storage media of claim 15 wherein processing the subsets to mine the co-location patterns comprises varying a size number indicative of how many objects of different types are used to determine a co-location pattern.

19. The one or more computer storage media of claim 15 having further computer-executable instructions comprising calculating a locality degree of at least some of the co-location patterns.

20. The method of claim 1, wherein generating the search results comprises:
- adding the second keyword to the input geographic search request; and
- executing the input geographic search request with the second keyword.

* * * * *